US012131680B2

(12) United States Patent
Woo et al.

(10) Patent No.: US 12,131,680 B2
(45) Date of Patent: Oct. 29, 2024

(54) DISPLAY APPARATUS AND METHOD OF DRIVING THE SAME

(71) Applicant: Samsung Display Co., Ltd., Yongin-Si (KR)

(72) Inventors: Deokhwa Woo, Suwon-si (KR); Myungwoo Lee, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/965,039

(22) Filed: Oct. 13, 2022

(65) Prior Publication Data

US 2023/0215323 A1 Jul. 6, 2023

(30) Foreign Application Priority Data

Jan. 6, 2022 (KR) ........................ 10-2022-0001928

(51) Int. Cl.
*G09G 3/20* (2006.01)

(52) U.S. Cl.
CPC ............ *G09G 3/2007* (2013.01); *G09G 3/20* (2013.01); *G09G 2300/0439* (2013.01); *G09G 2320/0233* (2013.01); *G09G 2320/0276* (2013.01); *G09G 2320/045* (2013.01); *G09G 2320/0686* (2013.01)

(58) Field of Classification Search
CPC .................. G09G 3/2007; G09G 3/20; G09G 2300/0439; G09G 2320/0233; G09G 2320/0276; G09G 2320/045; G09G 2320/0686
See application file for complete search history.

(56) References Cited

U.S. PATENT DOCUMENTS 9,412,304 B2 * 8/2016 Park ........................ G09G 3/007
9,589,492 B2 * 3/2017 Feng .................... G09G 3/2983
10,332,436 B2 * 6/2019 Xu ...................... G09G 3/3208
11,062,637 B2 * 7/2021 Jeong .................. G09G 3/3208
11,527,592 B2 * 12/2022 Shan ....................... G09G 3/20
11,532,283 B2 * 12/2022 Jang ..................... G09G 3/3233
2015/0015466 A1 * 1/2015 Feng ...................... G09G 3/007 345/76
2016/0189619 A1 * 6/2016 Park .................... G09G 3/3233 345/77
2016/0196786 A1 * 7/2016 Kim ....................... G09G 3/20 345/697

(Continued)

FOREIGN PATENT DOCUMENTS

KR 10-2005-0036627 A 4/2005
KR 10-1766248 B1 8/2017
KR 10-2021-0134150 A 11/2021

*Primary Examiner* — Michael J Jansen, II
(74) *Attorney, Agent, or Firm* — Innovation Counsel LLP

(57) ABSTRACT

A display apparatus includes a display panel and a display panel driver. The display panel includes a first display area having a first pixel structure and a second display area having a second pixel structure different from the first pixel structure. The display panel driver drives the display panel in a first mode when an image complexity of input image data corresponding to a determination area which includes the first display area is greater than a threshold value and to drive the display panel in a second mode different from the first mode when the image complexity of the input image data is less than or equal to the threshold value.

15 Claims, 16 Drawing Sheets

(56) References Cited

U.S. PATENT DOCUMENTS

| | | | | |
|---|---|---|---|---|
| 2017/0308194 | A1* | 10/2017 | Guard | G06F 3/0445 |
| 2018/0342189 | A1* | 11/2018 | Xu | G09G 3/2003 |
| 2020/0365070 | A1* | 11/2020 | Jeong | G09G 3/2003 |
| 2021/0359053 | A1* | 11/2021 | Shan | H10K 59/353 |
| 2022/0148522 | A1* | 5/2022 | Jang | G09G 3/3291 |

* cited by examiner

FIG. 9A

| | | |
|---|---|---|
| -1 | 0 | 1 |
| -2 | 0 | 2 |
| -1 | 0 | 1 |

FIG. 9B

| | | |
|---|---|---|
| 1 | 2 | 1 |
| 0 | 0 | 0 |
| -1 | -2 | -1 |

DISPLAY APPARATUS AND METHOD OF DRIVING THE SAME

PRIORITY STATEMENT

This application claims priority under 35 U.S.C. § 119 to Korean Patent Application No. 10-2022-0001928, filed on Jan. 6, 2022, in the Korean Intellectual Property Office KIPO, the contents of which are herein incorporated by reference in its entireties.

BACKGROUND

1. Field

Example embodiments of the present inventive concept relate to a display apparatus and a method of driving the display apparatus. More particularly, example embodiments of the present inventive concept relate to a display apparatus including display areas having different pixel structures and a method of driving the display apparatus.

2. Description of the Related Art

Generally, a display apparatus includes a display panel and a display panel driver. The display panel includes a plurality of gate lines, a plurality of data lines, a plurality of emission lines and a plurality of pixels. The display panel driver includes a gate driver, a data driver, an emission driver and a driving controller. The gate driver outputs gate signals to the gate lines. The data driver outputs data voltages to the data lines. The emission driver outputs emission signals to the emission lines. The driving controller controls the gate driver, the data driver and the emission driver.

The display apparatus may further include an electronic module to perform an additional function. When the electronic module is disposed under the display panel, for performing an operation of the electronic module, a pixel structure in an area corresponding to the electronic module and an area not corresponding to the electronic module may be formed differently.

In addition, the display apparatus may include an edge area of the display panel having a pixel structure different from a pixel structure of a center area of the display panel.

When the display panel includes the areas having the different pixel structures, a difference of luminances or degrees of deterioration may occur between areas having different pixel structures.

SUMMARY

Example embodiments of the present inventive concept provide a display apparatus determining a method of driving display areas having different pixel structures based on an image complexity to enhance a display quality.

Example embodiments of the present inventive concept also provide a method of driving the display apparatus.

In an example embodiment of a display apparatus according to the present inventive concept, the display apparatus includes a display panel and a display panel driver. The a display panel includes a first display area having a first pixel structure and a second display area having a second pixel structure different from the first pixel structure. The display panel driver drives the display panel in a first mode when an image complexity of input image data corresponding to a determination area which includes the first display area is greater than a threshold value and driving the display panel in a second mode different from the first mode when the image complexity of the input image data is less than or equal to the threshold value.

In an example embodiment, a difference of a luminance of the first display area and a luminance of the second display area for the same grayscale value in the first mode may be greater than a difference of a luminance of the first display area and a luminance of the second display area for the same grayscale value in the second mode.

In an example embodiment, the luminance of the first display area may be less than the luminance of the second display area for the same grayscale value in the first mode.

In an example embodiment, the luminance of the first display area may be substantially the same as the luminance of the second display area for the same grayscale value in the second mode.

In an example embodiment, when an area of the second display area adjacent to the first display area and surrounding the first display area is referred to as a first adjacent display area, a luminance of the first display area may be less than a luminance of the first adjacent display area for the same grayscale value and the luminance of the first adjacent display area may be less than a luminance of an area of the second display area except for the first adjacent display area for the same grayscale value in the first mode.

In an example embodiment, the second display area includes a first adjacent display area disposed adjacent to the first display area and surrounding the first display area, a second adjacent display area disposed adjacent to the first adjacent display area and surrounding the first adjacent display area and a third adjacent display area disposed adjacent to the second adjacent display area and surrounding the second adjacent display area, a luminance of the first display area is less than a luminance of the first adjacent display area for the same grayscale value, the luminance of the first adjacent display area may be less than a luminance of the second adjacent display area for the same grayscale value, the luminance of the second adjacent display area may be less than a luminance of the third adjacent display area for the same grayscale value and the luminance of the third adjacent display area may be less than a luminance of an area of the second display area except for the first adjacent display area, the second adjacent display area and the third adjacent display area for the same grayscale value in the first mode.

In an example embodiment, a gamma compensation of the first display area may be performed based on a captured image of the first display area and a gamma compensation of the second display area is performed based on a captured image of the second display area in the second mode.

In an example embodiment, the determination area may include the first display area and a portion of the second display area disposed adjacent to the first display area.

In an example embodiment, the determination area may include an entirety of the first display area and an entirety of the second display area.

In an example embodiment, the display panel driver may determine edge information amount using an edge filter and to determine an amount of edges using an edge filter and determines the image complexity based on the amount of the edges.

In an example embodiment, the display panel driver may determines an amount of a vertical edges using a vertical edge filter. The vertical edge filter may be $$\begin{pmatrix} -a & 0 & a \\ -b & 0 & b \\ -a & 0 & a \end{pmatrix}.$$

An absolute value of b may be greater than an absolute value of a.

In an example embodiment, the display panel driver may determine an amount of horizontal edges using a horizontal edge filter. The horizontal edge filter may be $$\begin{pmatrix} c & d & c \\ 0 & 0 & 0 \\ -c & -d & -c \end{pmatrix}.$$

An absolute value of d may be greater than an absolute value of c.

In an example embodiment, a density of pixels of the first display area may be less than a density of pixels of the second display area.

In an example embodiment, the display apparatus may further include a camera module disposed under the display panel to overlap the first display area.

In an example embodiment, the first display area may have a circular shape.

In an example embodiment, the display apparatus may further include a plurality of sensors disposed under the display panel to overlap the first display area.

In an example embodiment, the first display area may be disposed at a first end portion of the display panel and has a rectangular shape.

In an example embodiment, the first display area may corresponds to curved portions disposed at edge portions of both sides of the display panel.

In an example embodiment, the first display area may corresponds to curved portions disposed at edge portions of four sides of the display panel.

In an example embodiment of a method of driving a display apparatus, the method includes determining an image complexity of input image data corresponding to a determination area which includes a first display area having a first pixel structure, driving the first display area and a second display area having a second pixel structure different from the first pixel structure in a first mode when the image complexity is greater than a threshold value and driving the first display area and the second display area in a second mode different from the first mode when the image complexity is less than or equal to the threshold value.

According to the display apparatus and the method of driving the display apparatus, the display apparatus may operate in a deterioration prevention mode or a luminance compensation mode according to an image complexity of input image data. When the image complexity is greater than a threshold value TH, a difference of luminances between a first display area and a second display area may not be easily perceived to a user so that a luminance of the first display area may be reduced and accordingly, a deterioration of a light emitting element of the first display area may be prevented. When the image complexity is less than the threshold value TH, the difference of luminances between the first display area and the second display area may be easily perceived to the user so that the display apparatus may be driven such that a luminance of the first display area and a luminance of the second display area is substantially same for a same grayscale value.

Therefore, the display quality of the display apparatus including the display areas having different pixel structures may be enhanced.

BRIEF DESCRIPTION OF THE DRAWINGS

The above and other features and advantages of the present inventive concept will become more apparent by describing in detailed example embodiments thereof with reference to the accompanying drawings, in which:

FIG. 9A is a conceptual diagram illustrating a first filter used for the operation of determining an image complexity of FIG. 6;

FIG. 9B is a conceptual diagram illustrating a second filter used for the operation of determining an image complexity of FIG. 6;

DETAILED DESCRIPTION OF THE INVENTIVE CONCEPT

Hereinafter, the present inventive concept will be explained in detail with reference to the accompanying drawings.

Figure 1:
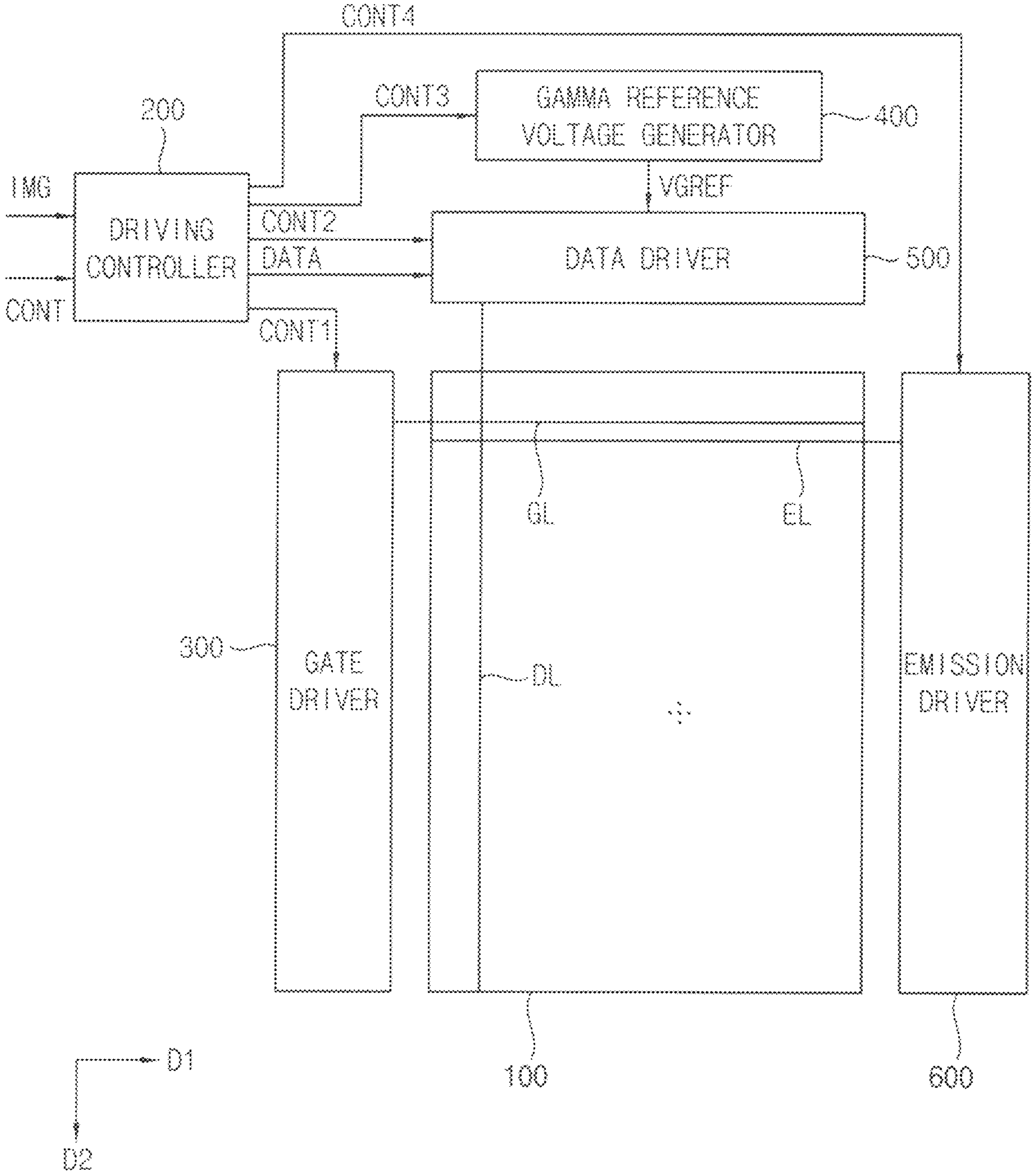
FIG. 1 is a block diagram illustrating a display apparatus according to an example embodiment of the present inventive concept.

FIG. 1 is a block diagram illustrating a display apparatus according to an example embodiment of the present inventive concept.

Referring to FIG. 1, the display apparatus includes a display panel 100 and a display panel driver. The display panel driver includes a driving controller 200, a gate driver 300, a gamma reference voltage generator 400, a data driver 500 and an emission driver 600.

The driving controller 200 and the data driver 500 may be integrally formed with components disposed on the display panel 100. The driving controller 200, the gamma reference voltage generator 400 and the data driver 500 may be integrally formed. The driving controller 200, the gate driver 300, the gamma reference voltage generator 400 and the data driver 500 may be integrally formed. The driving controller 200, the gate driver 300, the gamma reference voltage generator 400, the data driver 500 and the emission driver 600 may be integrally formed.

The display panel 100 includes a plurality of gate lines GL, a plurality of data lines DL, a plurality of emission lines EL and a plurality of pixels electrically connected to the gate lines GL, the data lines DL and the emission lines EL. The gate lines GL may extend in a first direction D1, the data lines DL may extend in a second direction D2 crossing the first direction D1 and the emission lines EL may extend in the first direction D1.

The driving controller 200 receives input image data IMG and an input control signal CONT from an external apparatus. For example, the input image data IMG may include red image data, green image data and blue image data. The input image data IMG may further include white image data. The input image data IMG may include magenta image data, cyan image data and yellow image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3, a fourth control signal CONT4 and a data signal DATA based on the input image data IMG and the input control signal CONT.

The driving controller 200 generates the first control signal CONT1 for controlling an operation of the gate driver 300 based on the input control signal CONT and outputs the first control signal CONT1 to the gate driver 300. The first control signal CONT1 may include a vertical start signal and a gate clock signal.

The driving controller 200 generates the second control signal CONT2 for controlling an operation of the data driver 500 based on the input control signal CONT and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT and outputs the third control signal CONT3 to the gamma reference voltage generator 400.

The driving controller 200 generates the fourth control signal CONT4 for controlling an operation of the emission driver 600 based on the input control signal CONT and outputs the fourth control signal CONT4 to the emission driver 600.

The gate driver 300 generates gate signals driving the gate lines GL in response to the first control signal CONT1 received from the driving controller 200. The gate driver 300 may output the gate signals to the gate lines GL. The gate driver 300 may be integrated on the display panel 100. The gate driver 300 may be mounted on the display panel 100.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

In an example embodiment, the gamma reference voltage generator 400 may be disposed in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

The emission driver 600 generates emission signals to drive the emission lines EL in response to the fourth control signal CONT4 received from the driving controller 200. The emission driver 600 may output the emission signals to the emission lines EL. The emission driver 600 may be integrated on the display panel 100. The emission driver 600 may be mounted on the display panel 100.

Although the gate driver 300 is disposed in a first side of the pixels of the display panel 100 and applies the gate signal to the pixels and the emission driver 600 is disposed in a second side of the pixels of the display panel 100 and applies the emission signal to the pixels for convenience of explanation in FIG. 1, the present inventive concept may not be limited thereto. Alternatively, the gate driver 300 and the emission driver 600 may be disposed in the first side of the pixels of the display panel 100 and apply the gate signal and the emission signal to the pixels. Alternatively, the gate drivers 300 and the emission drivers 600 may be disposed in both sides of the pixels of the display panel 100 and apply the gate signal and the emission signal to the pixels.

Figure 2:
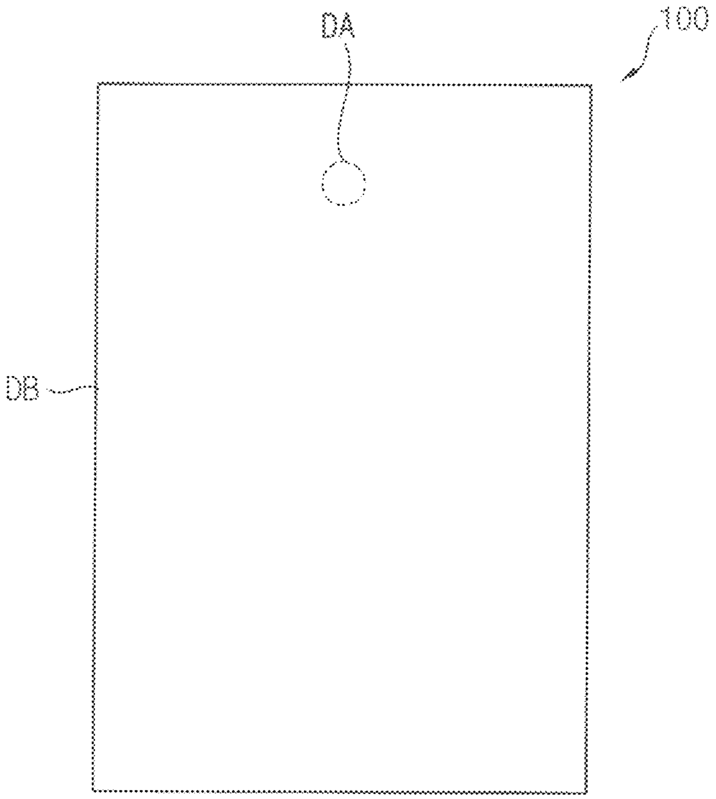
FIG. 2 is a conceptual diagram illustrating a display panel of FIG. 1.
Figure 3:
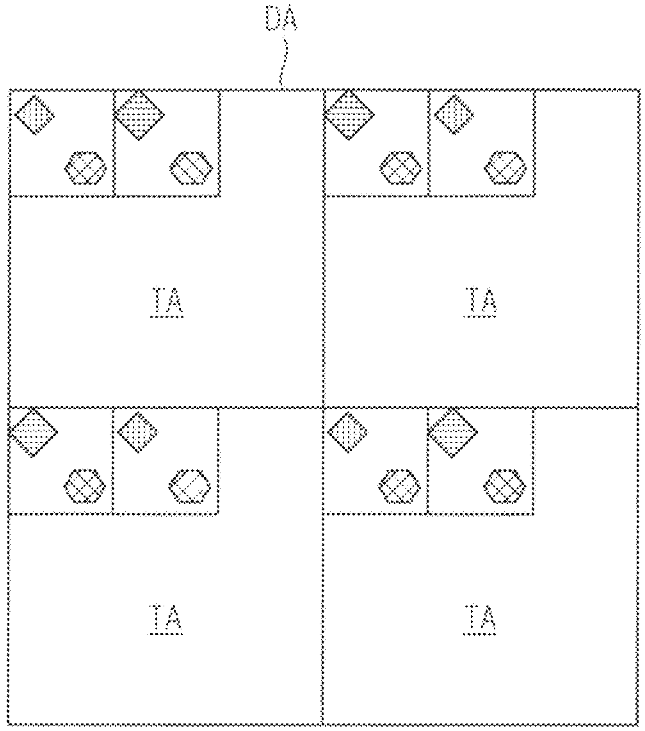
FIG. 3 is a conceptual diagram illustrating an example of a pixel structure of a first display area of FIG. 2.
Figure 4:
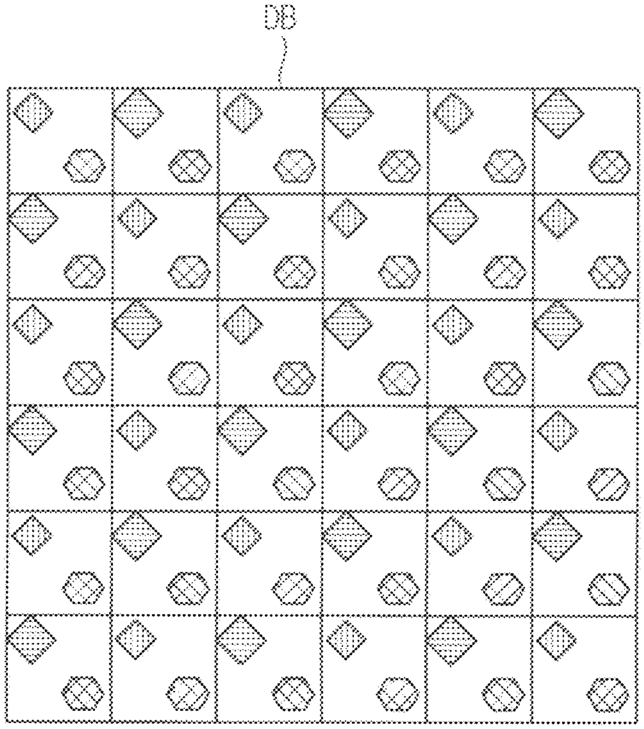
FIG. 4 is a conceptual diagram illustrating an example of a pixel structure of a second display area of FIG. 2.

FIG. 2 is a conceptual diagram illustrating the display panel 100 of FIG. 1. FIG. 3 is a conceptual diagram illustrating an example of a pixel structure of a first display area DA of FIG. 2. FIG. 4 is a conceptual diagram illustrating an example of a pixel structure of a second display area DB of FIG. 2.

Referring to FIGS. 1 to 4, the display panel 100 may include a first display area DA and a second display area DB.

For example, the display apparatus may further include an electronic module disposed under the display panel 100.

The electronic module may be an electronic element using light or sound. For example, the electronic element may be a sensor receiving and using light like an infrared sensor. For example, the electronic element may be a camera capturing images by receiving light. For example, the electronic element may be a sensor measuring a distance of an object or recognizing a fingerprint by outputting and detecting light and sound. For example, the electronic element may be a lamp outputting light. For example, the electronic element may be a speaker outputting sound. The electronic element using light may use light in various wavelength bands such as visible light, infrared light, and ultraviolet light In the present embodiment, the electronic module may be a camera module. In the present embodiment, the camera module may overlap an area disposed at a first end portion of the display panel 100. The camera module may have a circular shape. The camera module may overlap the first display area DA of the display panel 100. The camera module may not overlap the second display area DB.

In the present embodiment, the first display area DA may be disposed at the first end portion of the display panel 100 and may have a circular shape overlapping the camera module. In the present embodiment, the second display area DB may be a portion of the display area of the display panel 100 except for the first display area DA. For example, the first display area DA and the second display area DB do not overlap each other and a total area of the first display area DA and the second display area DB may cover all of the display area of the display panel 100.

The first display area DA may be referred to as a UPC (under panel camera) area. The second display area DB may be referred to as a normal display area. The UPC area may mean a display area where the camera module is disposed. For example, the first display area DA may include a transmitting portion and a display portion, and the second display area DB may not include the transmitting portion but may include only the display portion.

A pixel structure of the first display area DA may be different from a pixel structure of the second display area DB. For example, a density of the pixels of the first display area DA may be different from a density of the pixels of the second display area DB. For example, a size of the pixel of the first display area DA may be different from a size of the pixel of the second display area DB. For example, an emitting area of the first display area DA may be different from an emitting area of the second display area DB. For example, the number of the pixels of the first display area DA per a unit area may be different from the number of the pixels of the second display area DB per the unit area. For example, a shape of the pixel of the first display area DA may be different from a shape of the pixel of the second display area DB.

For example, a size of a switching element in the pixel of the first display area DA may be different from a size of a switching element in the pixel of the second display area DB. For example, a current-voltage curve of the switching element in the pixel of the first display area DA may be different from a current-voltage curve of the switching element in the pixel of the second display area DB. For example, a luminance per a unit area of the first display area DA may be different from a luminance per the unit area of the second display area DB.

As shown in FIG. 3, the first display area DA may include the display portion where the pixels are disposed and the transmitting portion TA where the pixels are not disposed. As shown in FIG. 4, the second display area DB may include only the display portion where the pixels are disposed. The second display area DB may not include the transmitting portion TA.

Figure 5:
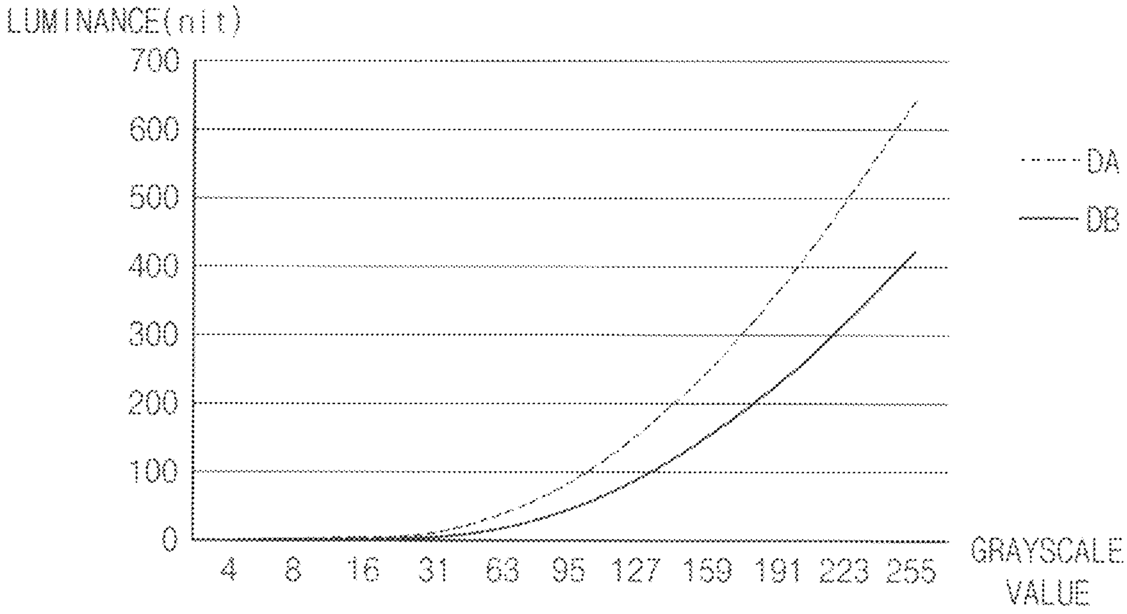
FIG. 5 is a graph illustrating luminances for grayscale values of the first display area of FIG. 2 and the second display area of FIG. 2.

FIG. 5 is a graph illustrating luminances for grayscale values of the first display area DA of FIG. 2 and the second display area DB of FIG. 2.

Referring to FIGS. 1 to 5, the first display area DA and the second display area DB have different pixel structures so that the first display area DA and the second display area DB may have different luminances for the same grayscale value.

The density of the pixels of the first display area DA may be less than the density of the pixels of the second display area DB to enhance a performance of the camera module. If a single pixel in the first display area DA and a single pixel in the second display area DB have the same luminance for the same grayscale value, the first display area DA may represent a luminance less than a luminance of the second display area DB when a single color image is displayed on an entire area of the display panel 100 so that a user may recognize the luminance difference between the first display area DA and the second display area DB. Thus, a unit pixel or a unit area of the first display area DA may display a luminance greater than a luminance of a unit pixel or a unit area of the second display area DB for the same grayscale value as shown in FIG. 5.

In order for the first display area DA to display a higher luminance than the second display area DB for the same grayscale value, the current flowing through a light emitting element of the pixel of the first display area DA may be set to be greater than the current flowing through a light emitting element of the pixel of the second display area DB. When the current flowing through the light emitting element of the pixel of the first display area DA is greater than the current flowing through the light emitting element of the pixel of the second display area DB, the light emitting element of the pixel of the first display area DA may deteriorate more rapidly than the light emitting element of the pixel of the second display area DB.

Figure 6:
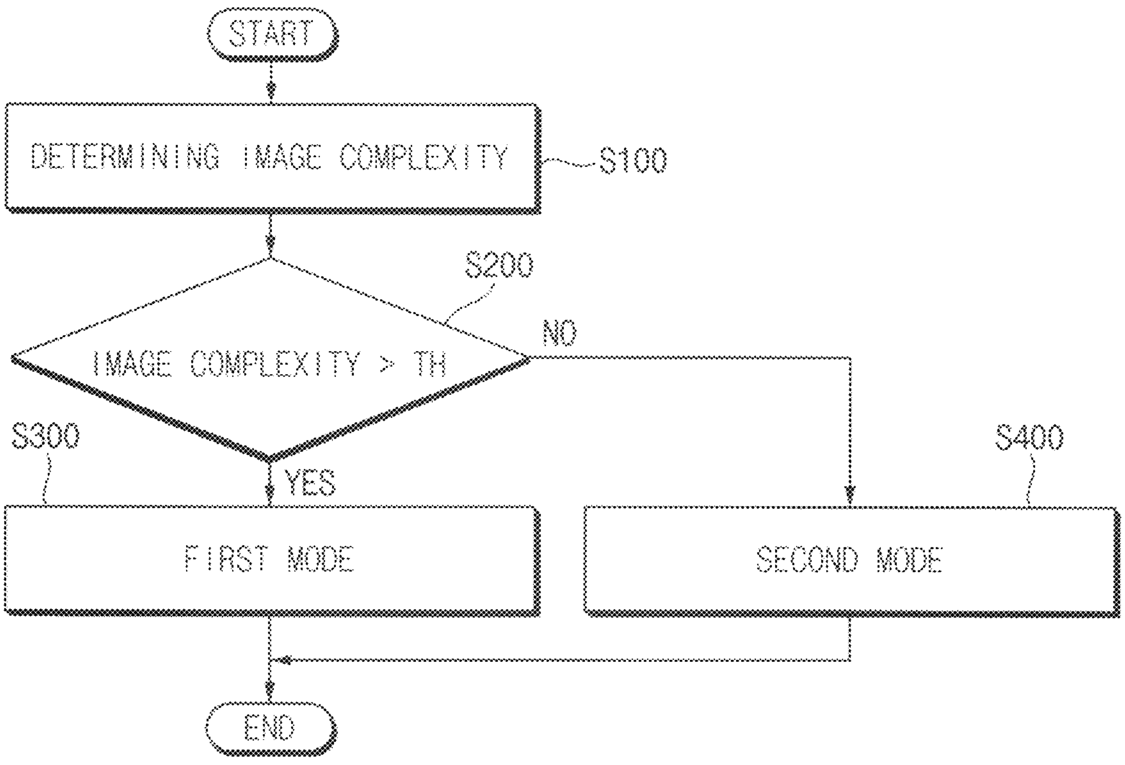
FIG. 6 is a flowchart diagram illustrating an operation of a driving controller of FIG. 1.

FIG. 6 is a flowchart diagram illustrating an operation of the driving controller 200 of FIG. 1.

Referring to FIGS. 1 to 6, the driving controller 200 may determine an image complexity of the input image data IMG corresponding to a determination area which includes the first display area DA (operation S100).

When the image complexity of the determination area is greater than a threshold value TH (operation S200), the display panel 100 may be driven in a first mode (operation S300).

When the image complexity is less than or equal to the threshold value TH (operation S200), the display panel 100 may be driven in a second mode (operation S400).

The first mode may be a deterioration prevention mode. The second mode may be a luminance compensation mode.

When the image complexity is great than the threshold value TH, the luminance difference between the first display area DA and the second display area DB may not be well recognized to the user so that the driving controller 200 may drive the display apparatus in the deterioration prevention mode to reduce the luminance of the first display area DA, which is highly likely to deteriorate, to be lower than the luminance of the second display area DB for the same grayscale value to prevent the deterioration of the light emitting element of the first display area DA.

In contrast, when the image complexity is less than or equal to the threshold value TH, the luminance difference between the first display area DA and the second display area DB may be well recognized to the user so that it is difficult to prevent deterioration of the light emitting element of the first display area DA by reducing the luminance of the first display area DA to be lower than the luminance of the second display area DB for the same grayscale value. Thus, when the image complexity is less than or equal to the threshold value TH, the driving controller 200 may drive the display apparatus in the luminance compensation mode such that the luminance of the first display area DA is substantially the same as the luminance of the second display area DB for the same grayscale value.

The difference of the luminance of the first display area DA and the luminance of the second display area DB for the same grayscale value in the first mode may be greater than the difference of the luminance of the first display area DA and the luminance of the second display area DB for the same grayscale value in the second mode.

In the first mode, the luminance of the first display area DA may be less than the luminance of the second display area DB for the same grayscale value. This operation may be referred to as the deterioration prevention operation of the first display area DA.

In the second mode, the luminance of the first display area DA may be substantially the same as the luminance of the second display area DB for the same gray scale value. This operation may be referred to as the luminance compensation operation of the first display area DA and the second display area DB.

Figure 7:
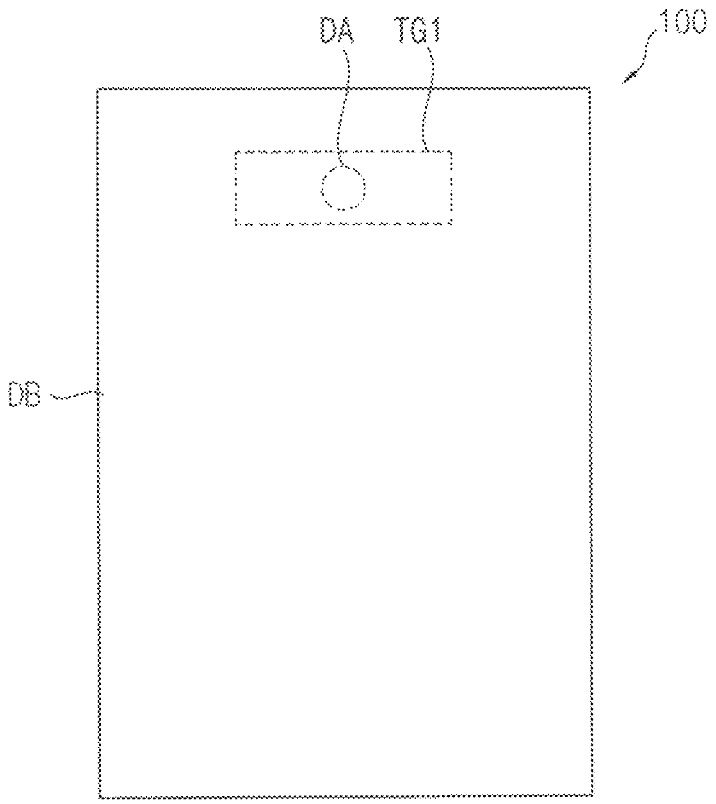
FIG. 7 is a conceptual diagram illustrating the display panel for explaining an operation of determining an image complexity of FIG. 6.
Figure 8A:
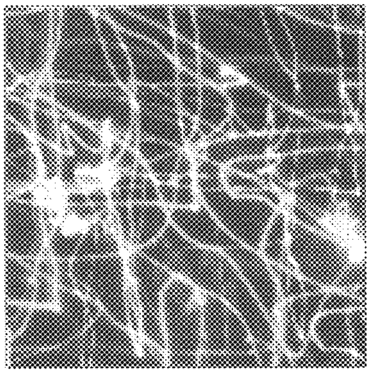
FIG. 8A is a conceptual diagram illustrating an example of an image having a high image complexity.
Figure 8B:
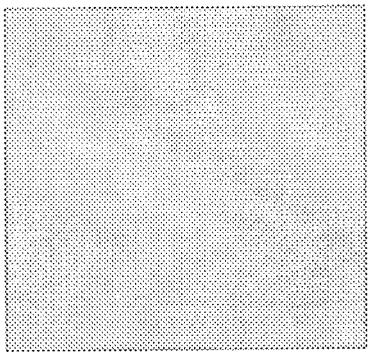
FIG. 8B is a conceptual diagram illustrating an example of an image having a low image complexity.

FIG. 7 is a conceptual diagram illustrating the display panel 100 for explaining the operation (operation S100) of determining the image complexity of FIG. 6. FIG. 8A is a conceptual diagram illustrating an example of an image having a high image complexity. FIG. 8B is a conceptual diagram illustrating an example of an image having a low image complexity. FIG. 9A is a conceptual diagram illustrating a first filter used for the operation of determining an image complexity of FIG. 6. FIG. 9B is a conceptual diagram illustrating a second filter used for the operation of determining an image complexity of FIG. 6.

Referring to FIGS. 1 to 9B, in the present embodiment, the determination area TG1 which is a target area for determining the image complexity may include the first display area DA and a portion of the second display area DB disposed adjacent to the first display area DA. The determination area TG1 may have a rectangular shape having a longer side in a horizontal direction. In order to determine whether to operate the deterioration prevention mode in which the luminance of the first display area DA is reduced compared to the luminance of the second display area DB for the same grayscale value, the image complexity near the first display area DA may be an important factor. Thus, the determination area TG1 may include the first display area DA and a portion of the second display area DB disposed adjacent to the first display area DA.

Herein, the image complexity may mean a degree of the complexity of the image. For example, when the input image data IMG represent a single color pattern, the image complexity may be very low. In contrast, when the input image data IMG represent a narrow horizontal stripe pattern, a narrow vertical stripe pattern or a narrow checker board pattern, the image complexity may be high. For example, the image complexity may be referred to as an image frequency. Herein, the image frequency does not mean a driving frequency of the display panel 100 such as 60 Hz or 120 Hz, but means the complexity of the image.

The image of FIG. 8A is an example of the image having a high image complexity and the image of FIG. 8B is an example of the image having a low image complexity. The image complexity (the image frequency) may be determined based on the number of edges in the image. A high frequency image represents an image having a high image complexity. The high frequency image may have many edges having local luminance differences in the image. In contrast, a low frequency image represents an image having a low image complexity. The low frequency image may have few edges having local luminance differences in the image. For example, the image of FIG. 8B is a single color image so that the image of FIG. 8B may not have the edge. Thus, the image complexity of the image of FIG. 8B may be extremely low. In contrast, the image of FIG. 8A includes many horizontal lines, many vertical lines and many curves so that the image of FIG. 8A may have many edges. Thus, the image complexity of the image of FIG. 8A may be high.

The driving controller 200 may determine an amount of edges in the image in the determination area TG1 using an edge filter and may determine the image complexity based on the amount of edges in the image in the determination area TG1. For example, absolute values of all edge values of all pixels in the determination area TG1 obtained by passing the edge filter are summed for the entire display panel 100. When the sum of the absolute values of all edge values of all pixels in the determination area TG1 is greater than the threshold value TH, the image complexity may be determined to be high.

Alternatively, the driving controller 200 may determine the image complexity based on a sum of absolute values of differences of grayscale values between adjacent pixels for the entire display panel 100 in the determination area TG1.

Alternatively, the driving controller 200 may determine the image complexity using a grayscale value histogram of the input image data IMG in the determination area TG1. The grayscale value histogram represents frequencies of grayscale values of all pixels in the determination area TG1. When the input image data IMG represent a single color pattern which has the low image complexity, the grayscale value histogram of the input image data IMG in the determination area TG1 is distributed to a specific grayscale value. In contrast, when the input image data IMG has the high image complexity, the grayscale value histogram of the input image data IMG in the determination area TG1 is not distributed to a specific grayscale value. For example, when the grayscale value histogram of the input image data IMG in the determination area TG1 is distributed mainly to a high grayscale value portion and a low grayscale value portion, the image complexity may be determined to be high. For example, when the number of the pixels having a grayscale value greater than (or greater than or equal to) a high grayscale threshold is greater than or equal to a predetermined number in the grayscale value histogram and the number of the pixels having a grayscale value less than (or less than or equal to) a low grayscale threshold is greater than or equal to a predetermined number in the grayscale value histogram, the image complexity of the input image data IMG in the determination area TG1 may be determined to be high.

The driving controller 200 may determine a vertical amount of edges using a vertical edge filter. The vertical edge filter may be $$\begin{pmatrix} -a & 0 & a \\ -b & 0 & b \\ -a & 0 & a \end{pmatrix}.$$

Herein, an absolute value of b may be greater than an absolute value of a. For example, a may be 1 and b may be 2 as shown in FIG. 9A. Contrary to FIG. 9A, when a is −1 and b is −2, the vertical edge filter may perform the same function.

When the vertical edge filter is applied to pixels in 3 rows and 3 columns, "−b" may be multiplied to a grayscale value of a pixel disposed at a left center and "−a" may be multiplied to a grayscale value of a pixel disposed at an upper left and a grayscale value of a pixel disposed at a lower left. 0 may be multiplied to a grayscale value of a pixel disposed at a center, a grayscale value of a pixel disposed at an upper center pixel and a grayscale value of a pixel disposed at a lower center pixel. "b" may be multiplied to a grayscale value of a pixel disposed at a right center and "a" may be multiplied to a grayscale value of a pixel disposed at a upper right and a grayscale value of a pixel disposed at a lower right. By summing all nine values calculated in this way, the amount of vertical edges for the center pixel may be obtained.

For example, when the grayscale value of three pixels disposed at the left side, for example, the upper left pixel, a middle left pixel and a lower left pixel, is 5, respectively, the grayscale value of the center pixels, the upper center pixel, the center pixel and the lower center pixel is 3, respectively, and the grayscale values of three pixels disposed at the right side, for example, the upper right pixel, the middle right pixel and the lower right pixel is 1, respectively, the vertical edge information amount may be −5a−5b−5a+0+0+0+a+b+a=−8a−4b by applying the vertical edge filter. This case represents that the vertical edge filter is applied to the image having a large amount of the vertical edge information.

For example, when the grayscale values of the pixels in 3 rows and 3 columns including the center pixel are respectively 5 (the single color pattern), the vertical edge information amount may be −5a−5b−5a+0+0+0+5a+5b+5a=0 by applying the vertical edge filter. This case represents that the vertical edge filter is applied to the image having a little amount of the vertical edge information.

The driving controller 200 may determine a horizontal edge information amount using a horizontal edge filter. The horizontal edge filter may be $$\begin{pmatrix} c & d & c \\ 0 & 0 & 0 \\ -c & -d & -c \end{pmatrix}.$$

Herein, an absolute value of d may be greater than an absolute value of c. For example, c may be 1 and d may be 2 as shown in FIG. 9B. Contrary to FIG. 9B, when c is −1 and d is −2, the horizontal edge filter may perform the same function.

When the horizontal edge filter is applied to pixels in 3 rows and 3 columns, "d" may be multiplied to a grayscale value of a pixel disposed at an upper center and "c" may be multiplied to a grayscale value of a pixel disposed at an upper left and a grayscale value of a pixel disposed at an upper right. 0 may be multiplied to a grayscale value of the center pixel, a grayscale value of a pixel disposed at a center left and a grayscale value of a pixel disposed at a center right. "−d" may be multiplied to a grayscale value of a pixel disposed at a lower center and "−c" may be multiplied to a grayscale value of a pixel disposed at a lower left and a grayscale value of a pixel disposed at a lower right. By summing all nine values calculated in this way, the amount of horizontal edges for the center pixel may be obtained.

The driving controller 200 may determine the amount of the vertical edge and the amount of the horizontal edge using the vertical edge filter and the horizontal edge filter. The driving controller 200 may determine the image complexity using the amount of the edges which is a sum of the amount of the vertical edge and the amount of the horizontal edge.

Figure 10:
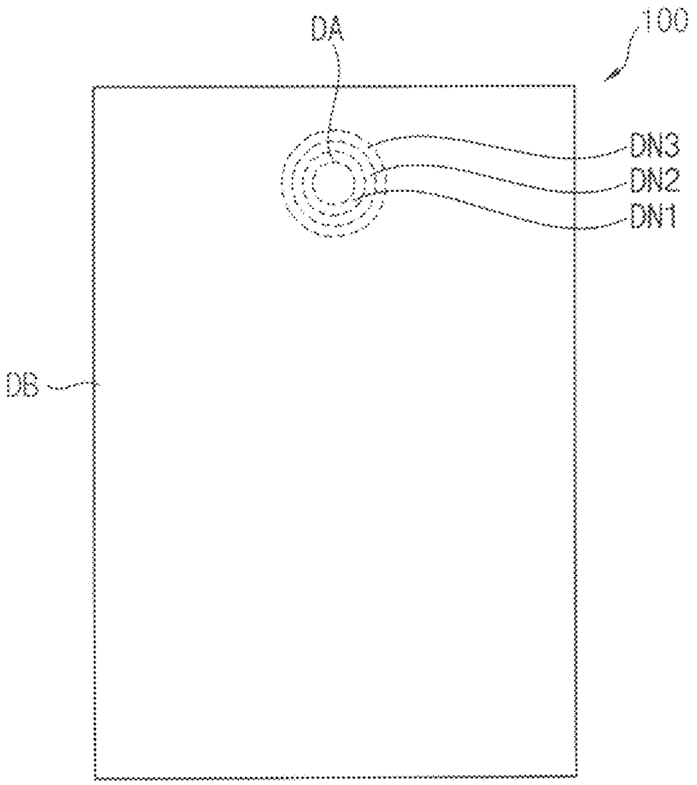
FIG. 10 is a conceptual diagram illustrating a first mode operation of FIG. 6.
Figure 11:
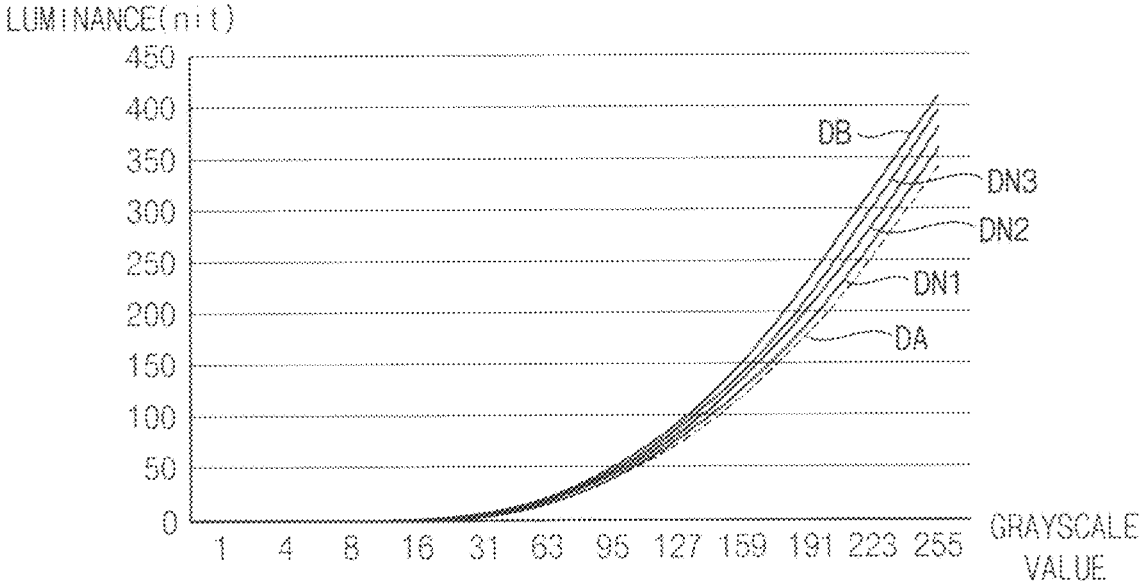
FIG. 11 is a graph illustrating luminances of each display area of FIG. 10 for the grayscale values in the first mode operation of FIG. 6.

FIG. 10 is a conceptual diagram illustrating a first mode operation (operation S300) of FIG. 6. FIG. 11 is a graph illustrating luminances of each display area of FIG. 10 for the grayscale values in the first mode operation (operation S300) of FIG. 6.

Referring to FIGS. 1 to 11, when the image complexity is greater than the threshold value TH, the luminance difference of the first display area DA and the second display area DB may not be well recognized to the user so that the driving controller 200 may reduce the luminance of the first display area DA, which is highly likely to deteriorate, to be lower than the luminance of the second display area DB to prevent the deterioration of the light emitting element of the first display area DA.

Even if the image complexity is high, when the luminance of the first display area DA and the luminance of the second display area DB have a great difference, the decrease of the luminance of the first display area DA may be recognized by the user. Thus, the luminance may gradually decrease from the second display area DB to the first display area DA.

An area of the second display area DB disposed adjacent to the first display area DA and surrounding the first display area DA may be referred to as a first adjacent display area DN1, an area of the second display area DB disposed adjacent to the first adjacent display area DN1 and surrounding the first adjacent display area DN1 may be referred to as a second adjacent display area DN2 and an area of the second display area DB disposed adjacent to the second adjacent display area DN2 and surrounding the second adjacent display area DN2 may be referred to as a third adjacent display area DN3. In the first mode, a luminance of the first display area DA may be less than a luminance of the first adjacent display area DN1 for the same grayscale value, the luminance of the first adjacent display area DN1 may be less than a luminance of the second adjacent display area DN2 for the same grayscale value, the luminance of the second adjacent display area DN2 may be less than a luminance of the third adjacent display area DN3 for the same grayscale value and the luminance of the third adjacent display area DN3 may be less than a luminance of an area of the second display area DB except for the first adjacent display area DN1, the second adjacent display area DN2 and the third adjacent display area DN3 for the same grayscale value.

For example, when the luminance of the area of the second display area DB except for the first adjacent display area DN1, the second adjacent display area DN2 and the third adjacent display area DN3 is X, the luminance of the third adjacent display area DN3 may be set to 0.9X, the luminance of the second adjacent display area DN2 may be set to 0.8X, the luminance of the first adjacent display area DN1 may be set to 0.7X and the luminance of the first display area DA may be set to 0.6X.

FIG. 11 is a graph representing the luminance of the first display area DA, the luminance of the first adjacent display area DN1, the luminance of the second adjacent display area DN2, the luminance of the third adjacent display area DN3 and the luminance of the area of the second display area DB except for the first adjacent display area DN1, the second adjacent display area DN2 and the third adjacent display area DN3.

Although the second display area DB includes three adjacent display areas surrounding the first display area DA in the present embodiment, the present inventive concept may not be limited thereto. The number of the adjacent display areas may be greater than or equal to one.

Figure 12:
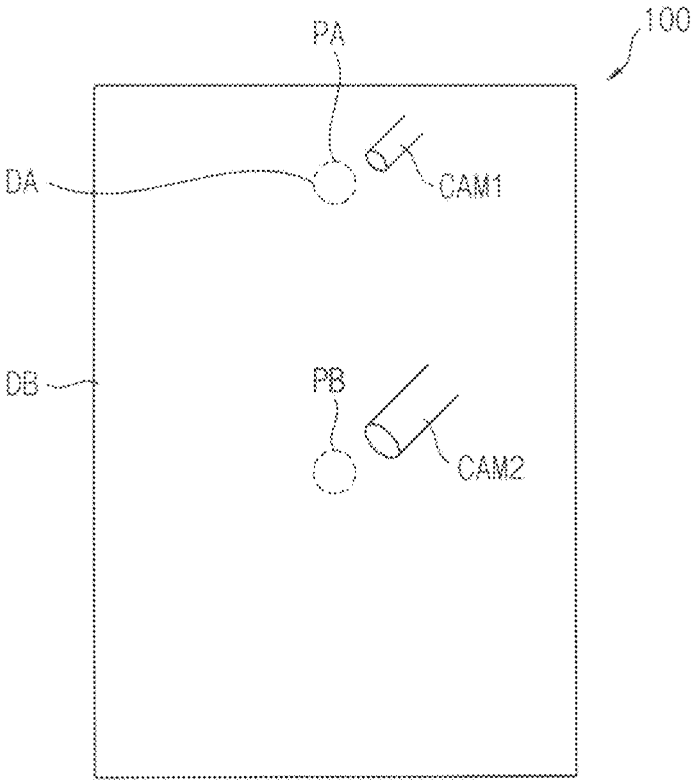
FIG. 12 is a conceptual diagram illustrating a second mode operation of FIG. 6.
Figure 13:
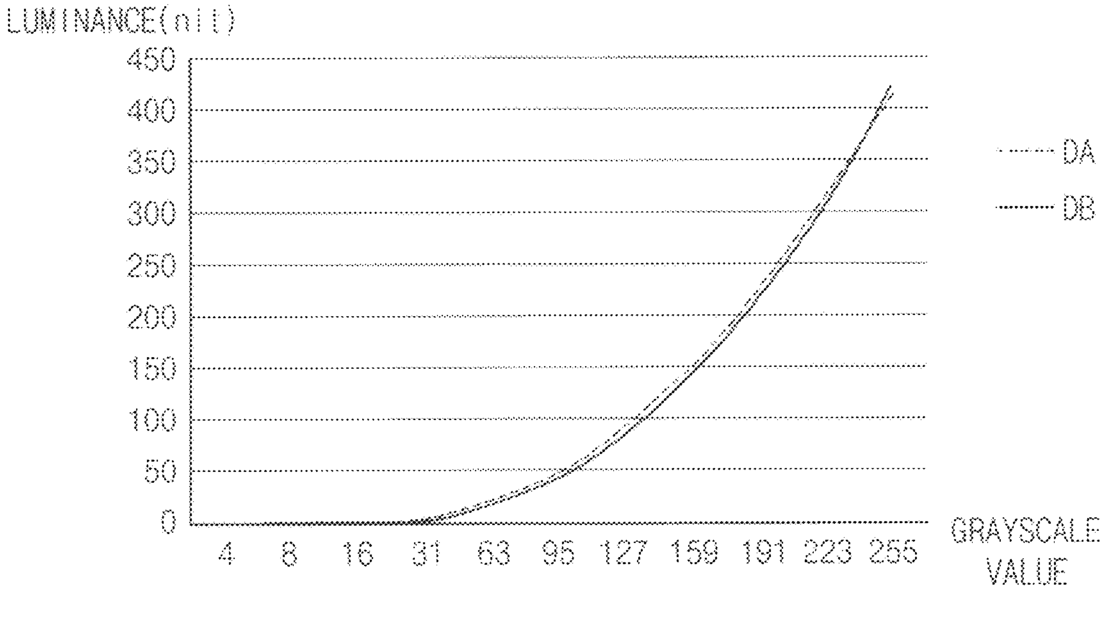
FIG. 13 is a graph illustrating luminances of the first display area of FIG. 2 and the second display area of FIG. 2 for the grayscale values in the second mode operation of FIG. 6.
Figure 14:
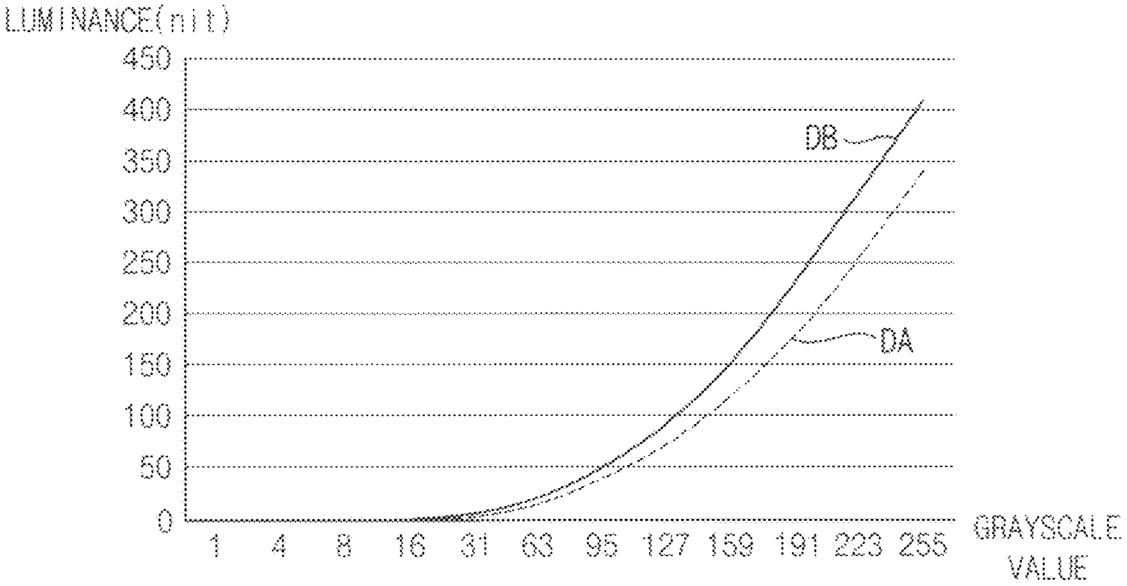
FIG. 14 is a graph illustrating luminances of the first display area of FIG. 2 and the second display area of FIG. 2 for grayscale values in a first mode operation of operations of a driving controller according to an example embodiment of the present inventive concept.

FIG. 12 is a conceptual diagram illustrating a second mode operation (operation S400) of FIG. 6. FIG. 13 is a graph illustrating luminances of the first display area DA of FIG. 2 and the second display area DB of FIG. 2 for the grayscale values in the second mode operation (operation S400) of FIG. 6;

Referring to FIGS. 1 to 13, when the image complexity is less than or equal to the threshold value TH, the luminance difference between the first display area DA and the second display area DB may be well recognized to the user so that it is difficult to prevent deterioration of the light emitting element of the first display area DA by reducing the luminance of the first display area DA to be lower than the luminance of the second display area DB. Thus, when the image complexity is less than or equal to the threshold value TH, the driving controller 200 may drive the display apparatus such that the luminance of the first display area DA is substantially the same as the luminance of the second display area DB for the same gray scale value.

In the second mode (operation S400), the gamma compensation of the first display area DA may be performed based on a captured image of the first display area DA and the gamma compensation of the second display area DB may be performed based on a captured image of the second display area DB.

For the gamma compensation of the second mode (operation S400), a first image displayed at a central portion PA of the first display area DA of the display panel 100 may be captured by a first imaging apparatus CAM1. The captured data by the first imaging apparatus CAM1 may be referred to as first image data.

For the gamma compensation of the second mode (operation S400), a second image displayed at a central portion PB of the second display area DB of the display panel 100 may be captured by a second imaging apparatus CAM2. The captured data by the second imaging apparatus CAM2 may be referred to as second image data.

For example, a diameter of a lens of the first imaging apparatus CAM1 may be less than a diameter of a lens of the second imaging apparatus CAM2.

The first display area DA may correspond to an area in which the camera module is disposed. The second display area DB may not correspond to the area in which the camera module is disposed. The pixel structure of the first display area DA may be different from the pixel structure of the second display area DB.

Generally, when the display apparatus does not include the camera module, only the central portion (e.g. PB) of the display panel 100 may be captured to perform the gamma compensation. However, when the display apparatus includes the camera module, the pixel structure of the first display area DA and the pixel structure of the second display area DB are different from each other. Thus, when only the central portion (e.g. PB) of the display panel 100 is captured to perform the gamma compensation for the display apparatus including the camera module, the gamma compensation may not be properly performed for the first display area DA.

Thus, in the present example embodiment, the gamma compensation may be performed using the first image data of the first display area DA and the second image data of the second display area DB.

According to the present embodiment, the display apparatus may operate in a deterioration prevention mode (operation S300) or a luminance compensation mode (operation S400) according to the image complexity of the input image data IMG. When the image complexity is greater than the threshold value TH, a difference of luminances between the first display area DA and the second display area DB may not be easily perceived to the user so that a luminance of the first display area DA may be reduced and accordingly, a deterioration of the light emitting element of the first display area DA may be prevented. When the image complexity is less than or equal to the threshold value TH, the difference of luminances between the first display area DA and the second display area DB may be easily perceived to the user so that the display apparatus may be driven such that a luminance of the first display area DA and a luminance of the second display area DB for the same gray scale value is substantially same.

Therefore, the display quality of the display apparatus including the display areas having different pixel structures may be enhanced.

Figure 15:
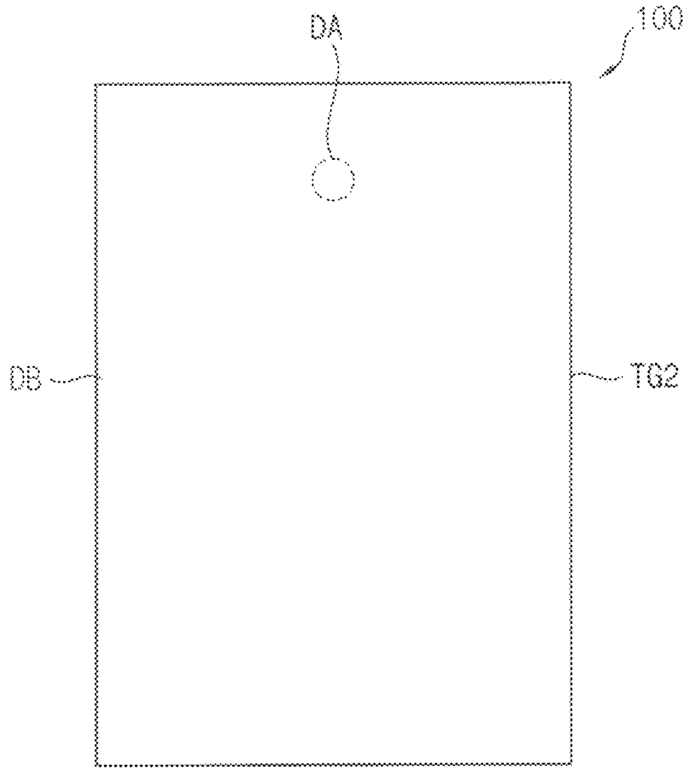
FIG. 15 is a conceptual diagram illustrating a display panel for explaining an operation of determining an image complexity of operations of a driving controller according to an example embodiment of the present inventive concept.

FIG. 15 is a conceptual diagram illustrating a display panel 100 for explaining an operation (operation S100) of determining an image complexity of operations of a driving controller 200 according to an example embodiment of the present inventive concept.

The display apparatus and the method of driving the display apparatus according to the present example embodiment is substantially the same as the display apparatus and the method of driving the display apparatus of the previous example embodiment explained referring to FIGS. 1 to 14 except for a shape of a determination area which is a target area for determining an image complexity. Thus, the same reference numerals will be used to refer to the same or like parts as those described in the previous example embodiment of FIGS. 1 to 14 and any repetitive explanation concerning the above elements will be omitted.

Referring to FIGS. 1 to 6 and 8A to 15, the display apparatus includes a display panel 100 and a display panel driver. The display panel driver includes a driving controller 200, a gate driver 300, a gamma reference voltage generator 400, a data driver 500 and an emission driver 600.

The driving controller 200 may determine an image complexity of the input image data IMG corresponding to a determination area including the first display area DA (operation S100).

When the image complexity is greater than a threshold value TH (operation S200), the display panel 100 may be driven in a first mode (operation S300).

When the image complexity is less than or equal to the threshold value TH (operation S200), the display panel 100 may be driven in a second mode (operation S400).

The first mode may be a deterioration prevention mode. The second mode may be a luminance compensation mode.

When the image complexity is greater than the threshold value TH, the luminance difference between the first display area DA and the second display area DB may not be well recognized to the user so that the driving controller 200 may reduce the luminance of the first display area DA, which is highly likely to deteriorate, to be lower than the luminance of the second display area DB for the same gray scale value to prevent the deterioration of the light emitting element of the first display area DA.

In contrast, when the image complexity is less than or equal to the threshold value TH, the luminance difference between the first display area DA and the second display area DB may be well recognized to the user so that it is difficult to prevent deterioration of the light emitting element of the first display area DA by reducing the luminance of the first display area DA to be lower than the luminance of the second display area DB for the same gray scale value. Thus, when the image complexity is less than or equal to the threshold value TH, the driving controller 200 may drive the display apparatus such that the luminance of the first display area DA is substantially the same as the luminance of the second display area DB for the same gray scale value.

In the present embodiment, the determination area TG2 which is a target area for determining the image complexity may include an entire first display area DA and an entire second display area DB. The image complexity may be determined in a relatively simple manner compared to the case of determining the image complexity near the first display area DA like FIG. 7. When all image data in the determination area TG2 are calculated, a computation load may increase so that the image complexity may be determined by sampling some image data in the determination area TG2.

According to the present embodiment, the display apparatus may operate in a deterioration prevention mode (operation S300) or a luminance compensation mode (operation S400) according to the image complexity of the input image data IMG. When the image complexity is greater than the threshold value TH, a difference of luminances between the first display area DA and the second display area DB may not be easily perceived to the user so that a luminance of the first display area DA may be reduced and accordingly, a deterioration of the light emitting element of the first display area DA may be prevented. When the image complexity is less than or equal to the threshold value TH, the difference of luminances between the first display area DA and the second display area DB may be easily perceived to the user so that the display apparatus may be driven such that a luminance of the first display area DA and a luminance of the second display area DB for the same gray scale value is substantially same.

Therefore, the display quality of the display apparatus including the display areas having different pixel structures may be enhanced.

Figure 16:
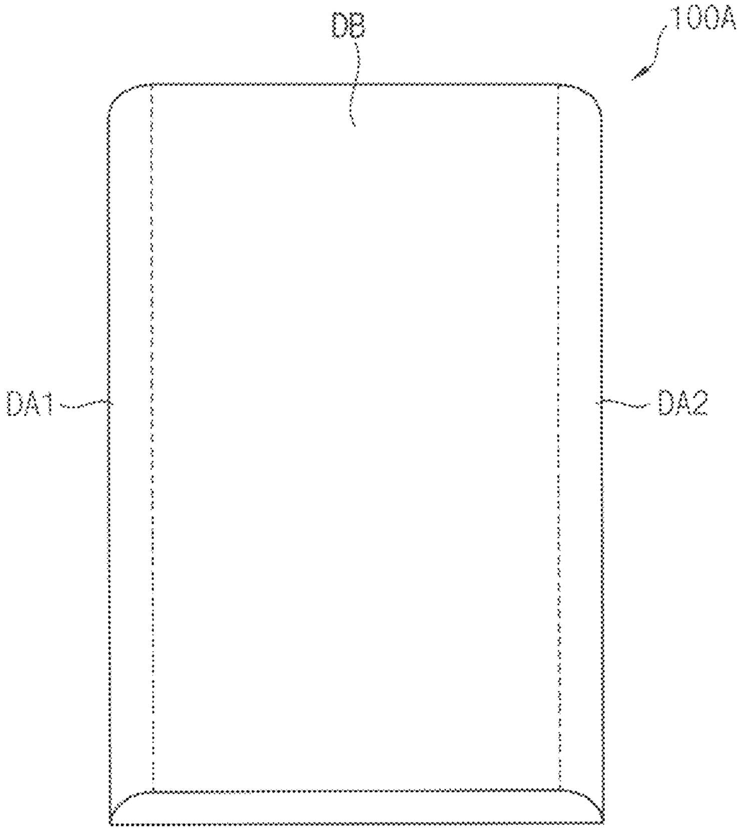
FIG. 16 is a conceptual diagram illustrating a display panel of a display apparatus according to an example embodiment of the present inventive concept.

FIG. 16 is a conceptual diagram illustrating a display panel 100A of a display apparatus according to an example embodiment of the present inventive concept.

The display apparatus and the method of driving the display apparatus according to the present example embodiment is substantially the same as the display apparatus and the method of driving the display apparatus of the previous example embodiment explained referring to FIGS. 1 to 14 except for a shape of a first display area. Thus, the same reference numerals will be used to refer to the same or like parts as those described in the previous example embodiment of FIGS. 1 to 14 and any repetitive explanation concerning the above elements will be omitted.

Referring to FIGS. 1, 3 to 14 and 16, the display apparatus includes a display panel 100A and a display panel driver. The display panel driver includes a driving controller 200, a gate driver 300, a gamma reference voltage generator 400, a data driver 500 and an emission driver 600.

The display panel 100A may include a first display area DA1 and DA2 and a second display area DB. The first display area DA1 and DA2 may correspond to curved portions disposed at edge portions of both sides of the display panel 100A.

A pixel structure of the first display area DA1 and DA2 may be different from a pixel structure of the second display area DB. For example, a density of the pixels of the first display area DA1 and DA2 may be different from a density of the pixels of the second display area DB. For example, a size of the pixel of the first display area DA1 and DA2 may be different from a size of the pixel of the second display area DB. For example, an emitting area of the first display area DA1 and DA2 may be different from an emitting area of the second display area DB. For example, the number of the pixels of the first display area DA1 and DA2 per a unit area may be different from the number of the pixels of the second display area DB per the unit area. For example, a shape of the pixel of the first display area DA1 and DA2 may be different from a shape of the pixel of the second display area DB.

For example, a size of a switching element in the pixel of the first display area DA1 and DA2 may be different from a size of a switching element in the pixel of the second display area DB. For example, a current-voltage curve of the switching element in the pixel of the first display area DA1 and DA2 may be different from a current-voltage curve of the switching element in the pixel of the second display area DB. For example, a luminance per a unit area of the first display area DA1 and DA2 may be different from a luminance per the unit area of the second display area DB.

For example, the second display area DB may be a normal display area. In contrast, the first display area DA1 and DA2 may be a special display area performing a simplified function in the edge portions of the display panel 100A. Thus, the density of the pixels of the first display area DA1 and DA2 per a unit area may be less than the density of the pixels per the unit area of the second display area DB.

The driving controller 200 may determine an image complexity of the input image data IMG corresponding to a determination area including the first display area DA1 and DA2 (operation S100).

When the image complexity is greater than a threshold value TH (operation S200), the display panel 100A may be driven in a first mode (operation S300).

When the image complexity is less than or equal to the threshold value TH (operation S200), the display panel 100A may be driven in a second mode (operation S400).

The first mode may be a deterioration prevention mode. The second mode may be a luminance compensation mode.

When the image complexity is greater than threshold value TH, the luminance difference between the first display area DA1 and DA2 and the second display area DB may not be well recognized to the user so that the driving controller 200 may reduce the luminance of the first display area DA1 and DA2, which is highly likely to deteriorate, to be lower than the luminance of the second display area DB to prevent the deterioration of the light emitting element of the first display area DA1 and DA2.

In contrast, when the image complexity is less than or equal to the threshold value TH, the luminance difference between the first display area DA1 and DA2 and the second display area DB may be well recognized to the user so that it is difficult to prevent deterioration of the light emitting element of the first display area DA1 and DA2 by reducing the luminance of the first display area DA1 and DA2 to be lower than the luminance of the second display area DB.

Thus, when the image complexity is less than or equal to the threshold value TH, the driving controller 200 may drive the display apparatus such that the luminance of the first display area DA1 and DA2 is substantially the same as the luminance of the second display area DB.

In the present embodiment, the determination area TG1 which is a target area for determining the image complexity may include the first display area DA1 and DA2 and a portion of the second display area DB disposed adjacent to the first display area DA1 and DA2. Alternatively, the determination area TG2 which is a target area for determining the image complexity may include an entire first display area DA1 and DA2 and an entire second display area DB.

According to the present embodiment, the display apparatus may operate in a deterioration prevention mode (operation S300) or a luminance compensation mode (operation S400) according to the image complexity of the input image data IMG. When the image complexity is greater than the threshold value TH, a difference of luminances between the first display area DA1 and DA2 and the second display area DB may not be easily perceived to the user so that a luminance of the first display area DA1 and DA2 may be reduced and accordingly, a deterioration of the light emitting element of the first display area DA1 and DA2 may be prevented. When the image complexity is less than or equal to the threshold value TH, the difference of luminances between the first display area DA1 and DA2 and the second display area DB may be easily perceived to the user so that the display apparatus may be driven such that a luminance of the first display area DA1 and DA2 and a luminance of the second display area DB is substantially same.

Therefore, the display quality of the display apparatus including the display areas having different pixel structures may be enhanced.

Figure 17:
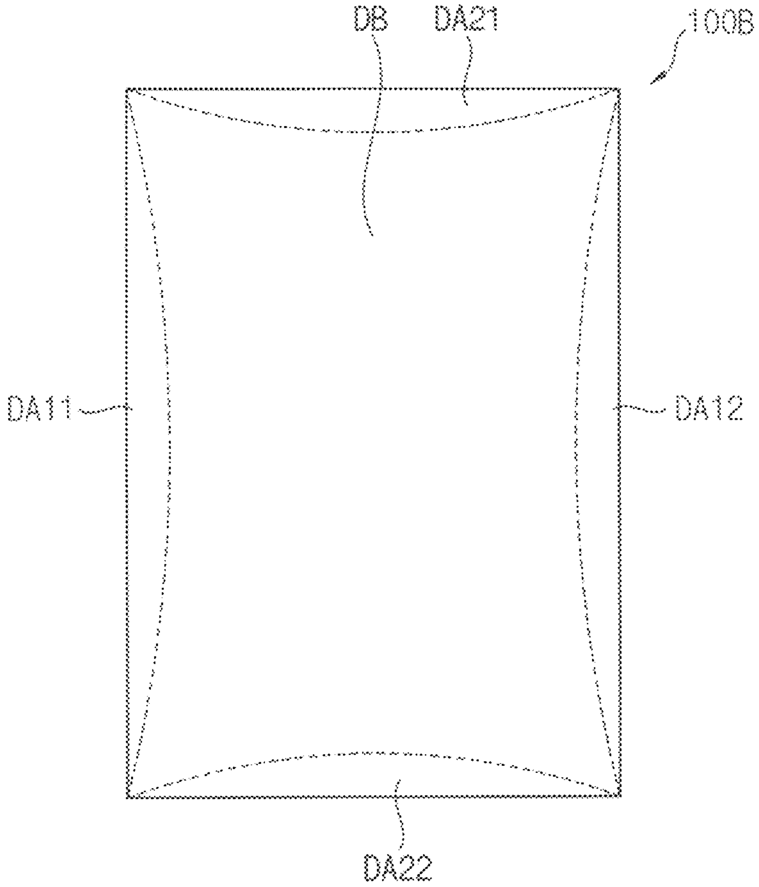
FIG. 17 is a conceptual diagram illustrating a display panel of a display apparatus according to an example embodiment of the present inventive concept.

FIG. 17 is a conceptual diagram illustrating a display panel 100B of a display apparatus according to an example embodiment of the present inventive concept.

The display apparatus and the method of driving the display apparatus according to the present example embodiment is substantially the same as the display apparatus and the method of driving the display apparatus of the previous example embodiment explained referring to FIGS. 1 to 14 except for a shape of a first display area. Thus, the same reference numerals will be used to refer to the same or like parts as those described in the previous example embodiment of FIGS. 1 to 14 and any repetitive explanation concerning the above elements will be omitted.

Referring to FIGS. 1, 3 to 14 and 17, the display apparatus includes a display panel 100B and a display panel driver. The display panel driver includes a driving controller 200, a gate driver 300, a gamma reference voltage generator 400, a data driver 500 and an emission driver 600.

The display panel 100B may include a first display area DA11, DA12, DA21 and DA22 and a second display area DB. The first display area DA11, DA12, DA21 and DA22 may correspond to curved portions disposed at edge portions of four sides of the display panel 100B.

A pixel structure of the first display area DA11, DA12, DA21 and DA22 may be different from a pixel structure of the second display area DB. For example, a density of the pixels per a unit area of the first display area DA11, DA12, DA21 and DA22 may be different from a density of the pixels per the unit area of the second display area DB. For example, a size of the pixel of the first display area DA11, DA12, DA21 and DA22 may be different from a size of the pixel of the second display area DB. For example, an emitting area of the first display area DA11, DA12, DA21 and DA22 may be different from an emitting area of the second display area DB. For example, the number of the pixels per a unit area of the first display area DA11, DA12, DA21 and DA22 may be different from the number of the pixels per the unit area of the second display area DB. For example, a shape of the pixel of the first display area DA11, DA12, DA21 and DA22 may be different from a shape of the pixel of the second display area DB.

For example, a size of a switching element in the pixel of the first display area DA11, DA12, DA21 and DA22 may be different from a size of a switching element in the pixel of the second display area DB. For example, a current-voltage curve of the switching element in the pixel of the first display area DA11, DA12, DA21 and DA22 may be different from a current-voltage curve of the switching element in the pixel of the second display area DB. For example, a luminance per a unit area of the first display area DA11, DA12, DA21 and DA22 may be different from a luminance per the unit area of the second display area DB.

For example, the second display area DB may be a normal display area. In contrast, the first display area DA11, DA12, DA21 and DA22 may be a special display area performing a simplified function in the edge portions of the display panel 100B. Thus, the density of the pixels per a unit area of the first display area DA11, DA12, DA21 and DA22 may be less than the density of the pixels per the unit area of the second display area DB.

The driving controller 200 may determine an image complexity of the input image data IMG corresponding to a determination area including the first display area DA11, DA12, DA21 and DA22 (operation S100).

When the image complexity is greater than a threshold value TH (operation S200), the display panel 100B may be driven in a first mode (operation S300).

When the image complexity is less than or equal to the threshold value TH (operation S200), the display panel 100B may be driven in a second mode (operation S400).

The first mode may be a deterioration prevention mode. The second mode may be a luminance compensation mode.

When the image complexity is greater than the threshold value TH, the luminance difference between the first display area DA11, DA12, DA21 and DA22 and the second display area DB may not be well recognized to the user so that the driving controller 200 may reduce the luminance of the first display area DA11, DA12, DA21 and DA22, which is highly likely to deteriorate, to be lower than the luminance of the second display area DB to prevent the deterioration of the light emitting element of the first display area DA11, DA12, DA21 and DA22.

In contrast, when the image complexity is less than or equal to the threshold value TH, the luminance difference between the first display area DA11, DA12, DA21 and DA22 and the second display area DB may be well recognized to the user so that it is difficult to prevent deterioration of the light emitting element of the first display area DA11, DA12, DA21 and DA22 by reducing the luminance of the first display area DA11, DA12, DA21 and DA22 to be lower than the luminance of the second display area DB. Thus, when the image complexity is less than or equal to the threshold value TH, the driving controller 200 may drive the display apparatus such that the luminance of the first display area DA11, DA12, DA21 and DA22 is substantially the same as the luminance of the second display area DB.

In the present embodiment, the determination area TG1 which is a target area for determining the image complexity may include the first display area DA11, DA12, DA21 and DA22 and a portion of the second display area DB disposed adjacent to the first display area DA11, DA12, DA21 and DA22. Alternatively, the determination area TG2 which is a target area for determining the image complexity may include an entire first display area DA11, DA12, DA21 and DA22 and an entire second display area DB.

According to the present embodiment, the display apparatus may operate in a deterioration prevention mode (operation S300) or a luminance compensation mode (operation S400) according to the image complexity of the input image data IMG. When the image complexity is greater than the threshold value TH, a difference of luminances between the first display area DA11, DA12, DA21 and DA22 and the second display area DB may not be easily perceived to the user so that a luminance of the first display area DA11, DA12, DA21 and DA22 may be reduced and accordingly, a deterioration of the light emitting element of the first display area DA11, DA12, DA21 and DA22 may be prevented. When the image complexity is less than or equal to the threshold value TH, the difference of luminances between the first display area DA11, DA12, DA21 and DA22 and the second display area DB may be easily perceived to the user so that the display apparatus may be driven such that a luminance of the first display area DA11, DA12, DA21 and DA22 and a luminance of the second display area DB is substantially same.

Therefore, the display quality of the display apparatus including the display areas having different pixel structures may be enhanced.

Figure 18:
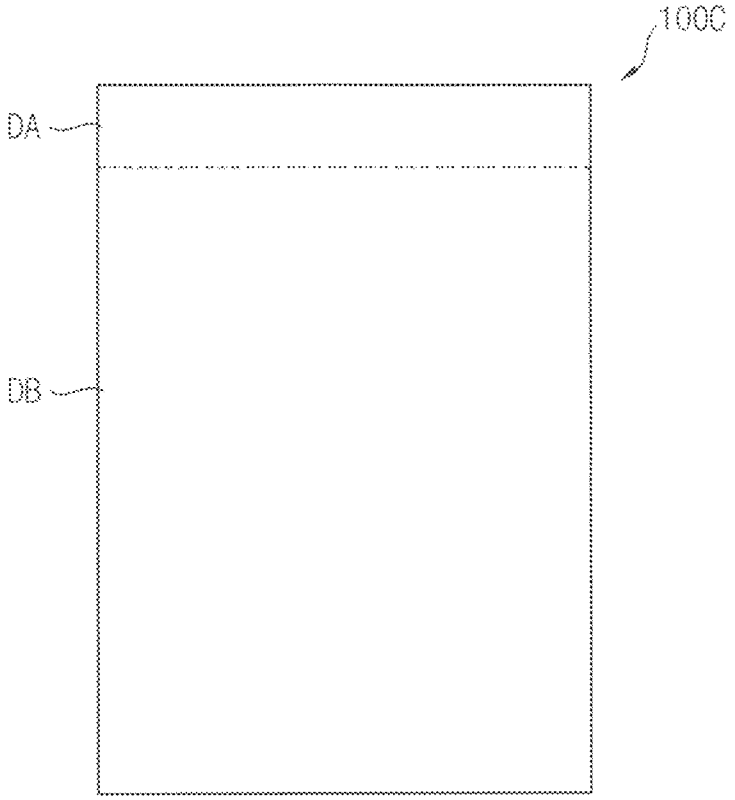
FIG. 18 is a conceptual diagram illustrating a display panel of a display apparatus according to an example embodiment of the present inventive concept.
Figure 19:
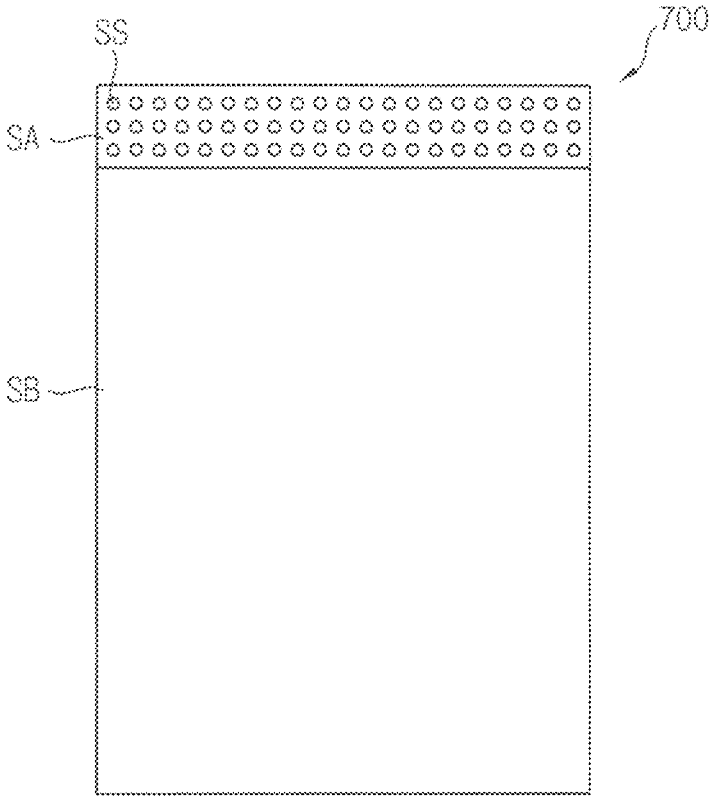
FIG. 19 is a conceptual diagram illustrating a sensor substrate of the display apparatus of FIG. 18.
Figure 20:
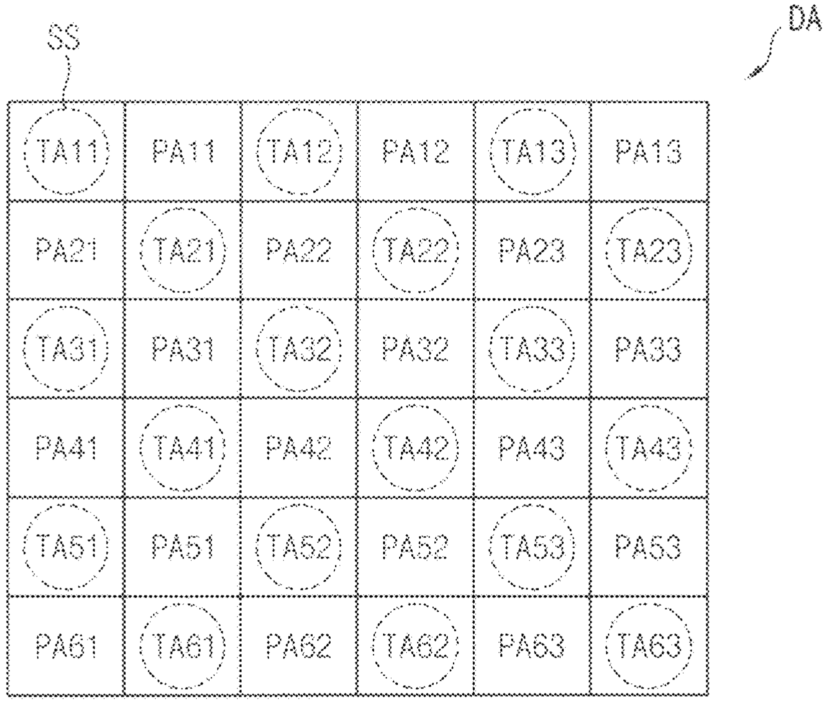
FIG. 20 is a conceptual diagram illustrating an example of positions of a first display area of FIG. 18 and a sensor of FIG. 19.
Figure 21:
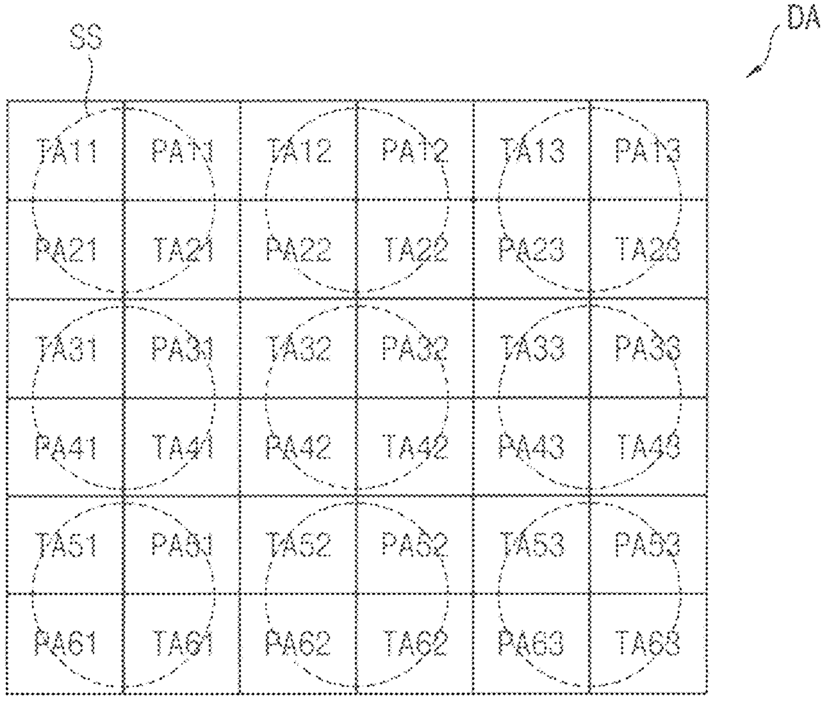
FIG. 21 is a conceptual diagram illustrating an example of positions of the first display area of FIG. 18 and the sensor of FIG. 19.

FIG. 18 is a conceptual diagram illustrating a display panel 100C of a display apparatus according to an example embodiment of the present inventive concept. FIG. 19 is a conceptual diagram illustrating a sensor substrate 700 of the display apparatus of FIG. 18. FIG. 20 is a conceptual diagram illustrating an example of positions of a first display area DA of FIG. 18 and a sensor SS of FIG. 19. FIG. 21 is a conceptual diagram illustrating an example of positions of the first display area DA of FIG. 18 and the sensor SS of FIG. 19.

The display apparatus and the method of driving the display apparatus according to the present example embodiment is substantially the same as the display apparatus and the method of driving the display apparatus of the previous example embodiment explained referring to FIGS. 1 to 14 except for a shape of a first display area and an electronic module. Thus, the same reference numerals will be used to refer to the same or like parts as those described in the previous example embodiment of FIGS. 1 to 14 and any repetitive explanation concerning the above elements will be omitted.

Referring to FIGS. 1, 3 to 14 and 18 to 21, the display apparatus includes a display panel 100C and a display panel driver. The display panel driver includes a driving controller 200, a gate driver 300, a gamma reference voltage generator 400, a data driver 500 and an emission driver 600.

The display panel 100C may include a first display area DA and a second display area DB.

The display apparatus may further include an electronic module disposed under the display panel 100C.

The electronic module may be an electronic element using light or sound. For example, the electronic element may be a sensor receiving and using light like an infrared sensor. For example, the electronic element may be a camera capturing images by receiving light. For example, the electronic element may be a sensor measuring a distance of an object or recognizing a fingerprint by outputting and detecting light and sound. For example, the electronic element may be a lamp outputting light. For example, the electronic element may be a speaker outputting sound. The electronic element using light may use light in various wavelength bands such as visible light, infrared light, and ultraviolet light The electronic module may include a plurality of sensors sensing a user. For example, the electronic module may function as at least one of a proximity sensor determining a proximity of the user, a gesture sensor determining the user's gesture, a fingerprint sensor recognizing the user's fingerprint, an iris recognition sensor recognizing the user's iris and a facial recognition sensor recognizing the user's face.

In the present embodiment, the electronic module may be a sensor module. The sensor module may be disposed under the display panel 100C. The sensor module may include a plurality of sensors SS overlapping the first display area DA.

The sensor module may include a sensor substrate 700. The sensor substrate 700 may include a first substrate area SA corresponding to the first display area DA and a second substrate area SB corresponding to the second display area DB. The sensors SS may be disposed in the first sensor area SA. In contrast, the sensors SS may not be disposed in the second sensor area SB.

For example, a size of a pixel area PA11, PA12, . . . , PA63 in the first display area DA may be same as a size of a non-pixel area TA11, TA12, . . . , TA63 in the first display area DA.

The subpixel or the pixel may not be disposed in the non-pixel area TA11, TA12, . . . , TA63.

The pixel area PA11, PA12, . . . , PA63 may display an image based on the input image data IMG. The non-pixel area TA11, TA12, . . . , TA63 may have a high transmittance for sensing operation of the sensor SS.

For example, the pixel area PA11, PA12, . . . , PA63 and the non-pixel area TA11, TA12, . . . , TA63 may form a checker board pattern. For example, non-pixel areas TA11, TA12 and TA13 and pixel areas PA11, PA12 and PA13 are alternately disposed in a first row of the first display area DA. For example, pixel areas PA21, PA22 and PA23 and non-pixel areas TA21, TA22 and TA23 are alternately disposed in a second row of the first display area DA. For example, non-pixel areas TA31, TA32 and TA33 and pixel areas PA31, PA32 and PA33 are alternately disposed in a third row of the first display area DA. For example, pixel areas PA41, PA42 and PA43 and non-pixel areas TA41, TA42 and TA43 are alternately disposed in a fourth row of the first display area DA. For example, pixel areas PA51, PA52 and PA53 and non-pixel areas TA51, TA52 and TA53 are alternately disposed in a fifth row of the first display area DA. For example, pixel areas PA61, PA62 and PA63 and non-pixel areas TA61, TA62 and TA63 are alternately disposed in a sixth row of the first display area DA.

Although the pixel areas PA11, PA12, . . . , PA63 and the non-pixel areas TA11, TA12, . . . , TA63 in six rows and six columns are illustrated in FIG. 20, the present inventive concept is not limited to the total number of the pixel areas PA11, PA12, . . . , PA63 and the non-pixel areas TA11, TA12, . . . , TA63.

For example, as shown in FIG. 20, the single sensor SS may be disposed in each of the single non-pixel area TA11, TA12, . . . , TA63.

In FIG. 20, the number of the pixel area PA11, PA12, . . . , PA63 may be same as the number of the non-pixel area TA11, TA12, . . . , TA63 in the first display area DA. If the first display area DA includes only the pixel area PA11, PA12, . . . , PA63 and the non-pixel area TA11, TA12, . . . , TA63, a ratio between the pixel area PA11, PA12, . . . , PA63 and the non-pixel area TA11, TA12, . . . , TA63 in the first display area DA may be 1:1. A ratio of a number of the pixel area PA11, PA12, . . . , PA63 in the first display area DA and the sum of a number of the pixel area PA and a number of the non-pixel area TA11, TA12, . . . , TA63 in the first display area DA may be ½.

The second display area DB may correspond to the second substrate area SB in which the sensor SS is not disposed so that the second display area DB may include only the pixel area.

For example, if the first display area DA includes only the pixel area PA11, PA12, . . . , PA63 and the non-pixel area TA11, TA12, . . . , TA63 and the ratio between the pixel area PA11, PA12, . . . , PA63 and the non-pixel area TA11, TA12, . . . , TA63 in the first display area DA is 1:1, the number of the pixel areas of the first display area DA in a unit area may be half of the number of the pixel areas of the second display area DB in the unit area. Thus, when the first display area DA and the second display area DB have the same pixel structure and the first display area DA and the second display area DB are driven in the same driving signal, the luminance of the first display area DA may be half of the luminance of the second display area DB.

In FIG. 21, the first display area DA may include a pixel area PA11, PA12, . . . , PA63 and a non-pixel area TA11, TA12, . . . , TA63. At least one subpixel may be disposed in the pixel area PA11, PA12, . . . , PA63. The subpixel or the pixel may not be disposed in the non-pixel area TA11, TA12, . . . , TA63.

The pixel area PA11, PA12, . . . , PA63 may display an image based on the input image data IMG. The non-pixel area TA11, TA12, . . . , TA63 may have a high transmittance for sensing operation of the sensor SS.

For example, as shown in FIG. 21, the single sensor SS may be disposed in the plural non-pixel areas. For example, the single sensor SS may be disposed in an area corresponding to four areas including two pixel areas and two non-pixel areas disposed in two rows and two columns. Herein, the sensor SS may sense the user through the non-pixel areas (e.g. TA11 and TA21).

In the present embodiment, the first display area DA may be disposed at a first end portion of the display panel 100C. The first display area DA may have a rectangular shape. In the present embodiment, the second display area DB may be a portion of the display area of the display panel 100C except for the first display area DA. For example, the first display area DA and the second display area DB do not overlap each other and the total area of the first display area DA and the second display area DB may cover all of the display area of the display panel 100C.

The first display area DA may be referred to as a UPS area. The second display area DB may be referred to as a normal display area. The UPS area may mean a display area where the sensor module is disposed.

A pixel structure of the first display area DA may be different from a pixel structure of the second display area DB. For example, a density of the pixels of the first display area DA may be different from a density of the pixels of the second display area DB. For example, a size of the pixel of the first display area DA may be different from a size of the pixel of the second display area DB. For example, an emitting area of the first display area DA may be different from an emitting area of the second display area DB. For example, the number of the pixels per a unit area of the first display area DA may be different from the number of the pixels per the unit area of the second display area DB. For example, a shape of the pixel of the first display area DA may be different from a shape of the pixel of the second display area DB.

For example, a size of a switching element in the pixel of the first display area DA may be different from a size of a switching element in the pixel of the second display area DB. For example, a current-voltage curve of the switching element in the pixel of the first display area DA may be different from a current-voltage curve of the switching element in the pixel of the second display area DB. For example, a luminance per a unit area of the first display area DA may be different from a luminance per the unit area of the second display area DB.

In the present embodiment, the density of the pixels per a unit area of the first display area DA may be less than the density of the pixels per the unit area of the second display area DB to enhance a performance of the sensor module.

The driving controller 200 may determine an image complexity of the input image data IMG corresponding to a determination area including the first display area DA (operation S100).

When the image complexity is greater than a threshold value TH (operation S200), the display panel 100C may be driven in a first mode (operation S300).

When the image complexity is less than or equal to the threshold value TH (operation S200), the display panel 100C may be driven in a second mode (operation S400).

The first mode may be a deterioration prevention mode. The second mode may be a luminance compensation mode.

When the image complexity is greater than the threshold value TH, the luminance difference between the first display area DA and the second display area DB may not be well recognized to the user so that the driving controller 200 may reduce the luminance of the first display area DA, which is highly likely to deteriorate, to be lower than the luminance of the second display area DB to prevent the deterioration of the light emitting element of the first display area DA.

In contrast, when the image complexity is less than or equal to the threshold value TH, the luminance difference between the first display area DA and the second display area DB may be well recognized to the user so that it is difficult to prevent deterioration of the light emitting element of the first display area DA by reducing the luminance of the first display area DA to be lower than the luminance of the second display area DB. Thus, when the image complexity is less than or equal to the threshold value TH, the driving controller 200 may drive the display apparatus such that the luminance of the first display area DA is substantially the same as the luminance of the second display area DB.

In the present embodiment, the determination area TG1 which is a target area for determining the image complexity may include the first display area DA and a portion of the second display area DB disposed adjacent to the first display area DA. Alternatively, the determination area TG2 which is a target area for determining the image complexity may include an entire first display area DA and an entire second display area DB.

According to the present embodiment, the display apparatus may operate in a deterioration prevention mode (operation S300) or a luminance compensation mode (operation S400) according to the image complexity of the input image data IMG. When the image complexity is greater than the threshold value TH, a difference of luminances between the first display area DA and the second display area DB may not be easily perceived to the user so that a luminance of the first display area DA may be reduced and accordingly, a deterioration of the light emitting element of the first display area DA may be prevented. When the image complexity is less than or equal to the threshold value TH, the difference of luminances between the first display area DA and the second display area DB may be easily perceived to the user so that the display apparatus may be driven such that a luminance of the first display area DA and a luminance of the second display area DB is substantially same.

Therefore, the display quality of the display apparatus including the display areas having different pixel structures may be enhanced.

According to the present inventive concept as explained above, the display quality of the display panel may be enhanced.

The foregoing is illustrative of the present inventive concept and is not to be construed as limiting thereof. Although a few example embodiments of the present inventive concept have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific example embodiments disclosed, and that modifications to the disclosed example embodiments, as well as other example embodiments, are intended to be included within the scope of the appended claims. The present inventive concept is defined by the following claims, with equivalents of the claims to be included therein.

What is claimed is:

1. A display apparatus comprising:

a display panel comprising a first display area having a first pixel density and a second display area having a second pixel density higher than the first pixel density; and a display panel driver driving the display panel in a first mode when an image complexity of input image data corresponding to a determination area which includes the first display area and a portion of the second display area disposed adjacent to the first display area is greater than a threshold value and driving the display panel in a second mode different from the first mode when the image complexity of the input image data corresponding to the determination area is less than or equal to the threshold value, wherein the second display area includes a first adjacent display area disposed adjacent to the first display area and surrounding the first display area, a second adjacent display area disposed adjacent to the first adjacent display area and surrounding the first adjacent display area and a third adjacent display area disposed adjacent to the second adjacent display area and surrounding the second adjacent display area, and wherein a luminance of the first display area is less than a luminance of the first adjacent display area for the same grayscale value, the luminance of the first adjacent display area is less than a luminance of the second adjacent display area for the same grayscale value, the luminance of the second adjacent display area is less than a luminance of the third adjacent display area for the same grayscale value and the luminance of the third adjacent display area is less than a luminance of an area of the second display area except for the first adjacent display area, the second adjacent display area and the third adjacent display area for the same grayscale value in the first mode.

2. The display apparatus of claim 1, wherein a difference of a luminance of the first display area and a luminance of the second display area for the same grayscale value in the first mode is greater than a difference of a luminance of the first display area and a luminance of the second display area for the same grayscale value in the second mode.

3. The display apparatus of claim 2, wherein the luminance of the first display area is less than the luminance of the second display area for the same grayscale value in the first mode.

4. The display apparatus of claim 3, wherein the luminance of the first display area is substantially the same as the luminance of the second display area for the same grayscale value in the second mode.

5. The display apparatus of claim 1, wherein a gamma compensation of the first display area is performed based on a captured image of the first display area and a gamma compensation of the second display area is performed based on a captured image of the second display area in the second mode.

6. The display apparatus of claim 1, wherein the display panel driver determines an amount of edges using an edge filter and determines the image complexity based on the amount of the edges.

7. The display apparatus of claim 6, wherein the display panel driver determines an amount of a vertical edges using a vertical edge filter, and wherein the vertical edge filter is $$\begin{pmatrix} -a & 0 & a \\ -b & 0 & b \\ -a & 0 & a \end{pmatrix},$$

and wherein an absolute value of b is greater than an absolute value of a.

8. The display apparatus of claim 6, wherein the display panel driver determines an amount of horizontal edges using a horizontal edge filter, and wherein the horizontal edge filter is $$\begin{pmatrix} c & d & c \\ 0 & 0 & 0 \\ -c & -d & -c \end{pmatrix},$$

and wherein an absolute value of d is greater than an absolute value of c.

9. The display apparatus of claim 1, further comprising a camera module disposed under the display panel to overlap the first display area.

10. The display apparatus of claim 9, wherein the first display area has a circular shape.

11. The display apparatus of claim 1, further comprising a plurality of sensors disposed under the display panel to overlap the first display area.

12. The display apparatus of claim 11, wherein the first display area is disposed at a first end portion of the display panel and has a rectangular shape.

13. The display apparatus of claim 1, wherein the first display area corresponds to curved portions disposed at edge portions of both sides of the display panel.

14. The display apparatus of claim 1, wherein the first display area corresponds to curved portions disposed at edge portions of four sides of the display panel.

15. A method of driving a display apparatus, the method comprising:

determining an image complexity of input image data corresponding to a determination area which includes a first display area having a first pixel density and a second display area surrounding the first display area and having a second pixel density greater than the first pixel density;

driving the first display area and a second display area to have the same luminance for the same grayscale value when the image complexity corresponding to the determination area is greater than a threshold value; and driving the first display area to have luminance greater than that of the second display area for the same grayscale value when the image complexity corresponding to the determination area is less than or equal to the threshold value, wherein the second display area includes a first adjacent display area disposed adjacent to the first display area and surrounding the first display area, a second adjacent display area disposed adjacent to the first adjacent display area and surrounding the first adjacent display area and a third adjacent display area disposed adjacent to the second adjacent display area and surrounding the second adjacent display area, and wherein a luminance of the first display area is less than a luminance of the first adjacent display area for the same grayscale value, the luminance of the first adjacent display area is less than a luminance of the second adjacent display area for the same grayscale value, the luminance of the second adjacent display area is less than a luminance of the third adjacent display area for the same grayscale value and the luminance of the third adjacent display area is less than a luminance of an area of the second display area except for the first adjacent display area, the second adjacent display area and the third adjacent display area for the same grayscale value in the first mode.

* * * * *